W. R. PIERCE.
SHOE SHINING MACHINE.
APPLICATION FILED JUNE 22, 1910. RENEWED OCT. 18, 1912.
1,049,393.
Patented Jan. 7, 1913.
6 SHEETS—SHEET 1.
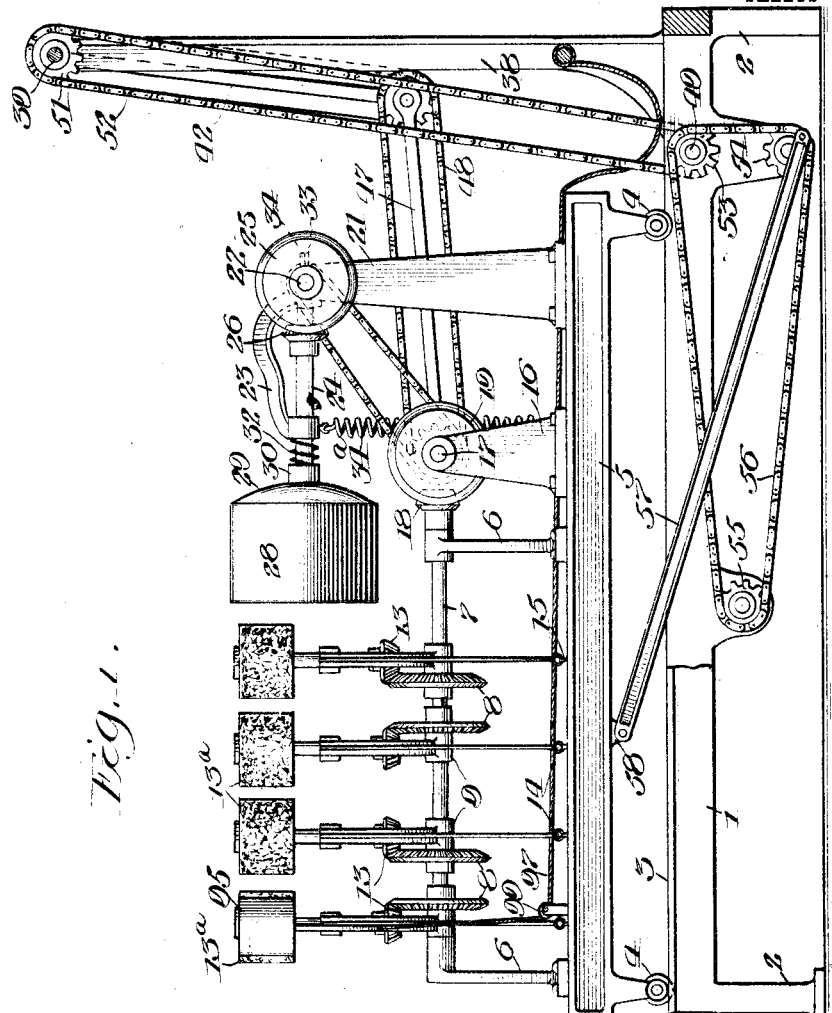
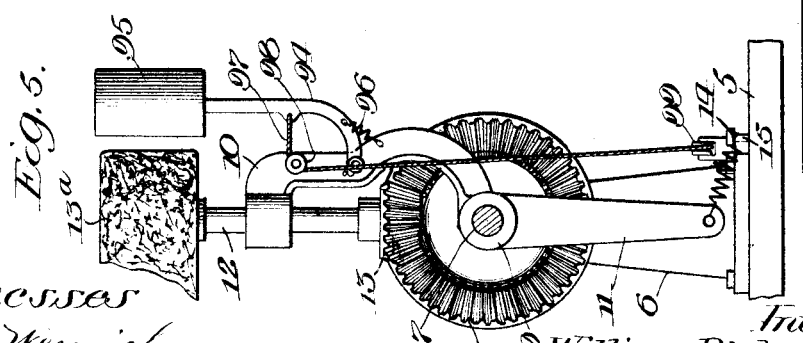
Witnesses
Inventor
William Richard Pierce W. R. PIERCE.
SHOE SHINING MACHINE.
APPLICATION FILED JUNE 22, 1910. RENEWED OCT. 18, 1912.

1,049,393.

Patented Jan. 7, 1913.
6 SHEETS—SHEET 2.

Witnesses

Inventor
William Richard Pierce

W. R. PIERCE.
SHOE SHINING MACHINE.
APPLICATION FILED JUNE 22, 1910. RENEWED OCT. 18, 1912.

1,049,393.

Patented Jan. 7, 1913.
6 SHEETS—SHEET 3.

Witnesses
Inventor
William Richard Pierce
by Benjamin & Ronabourn
Atty

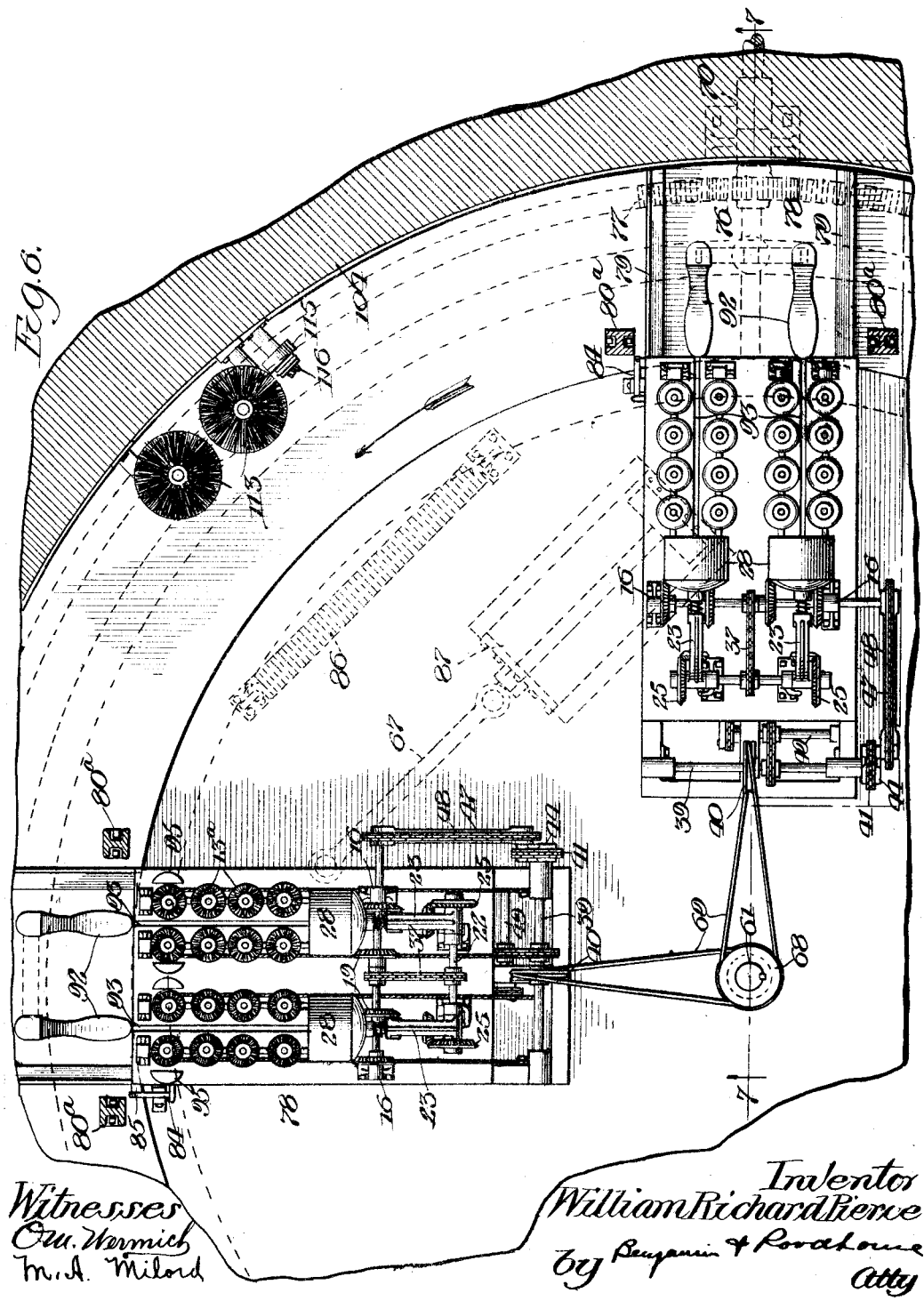

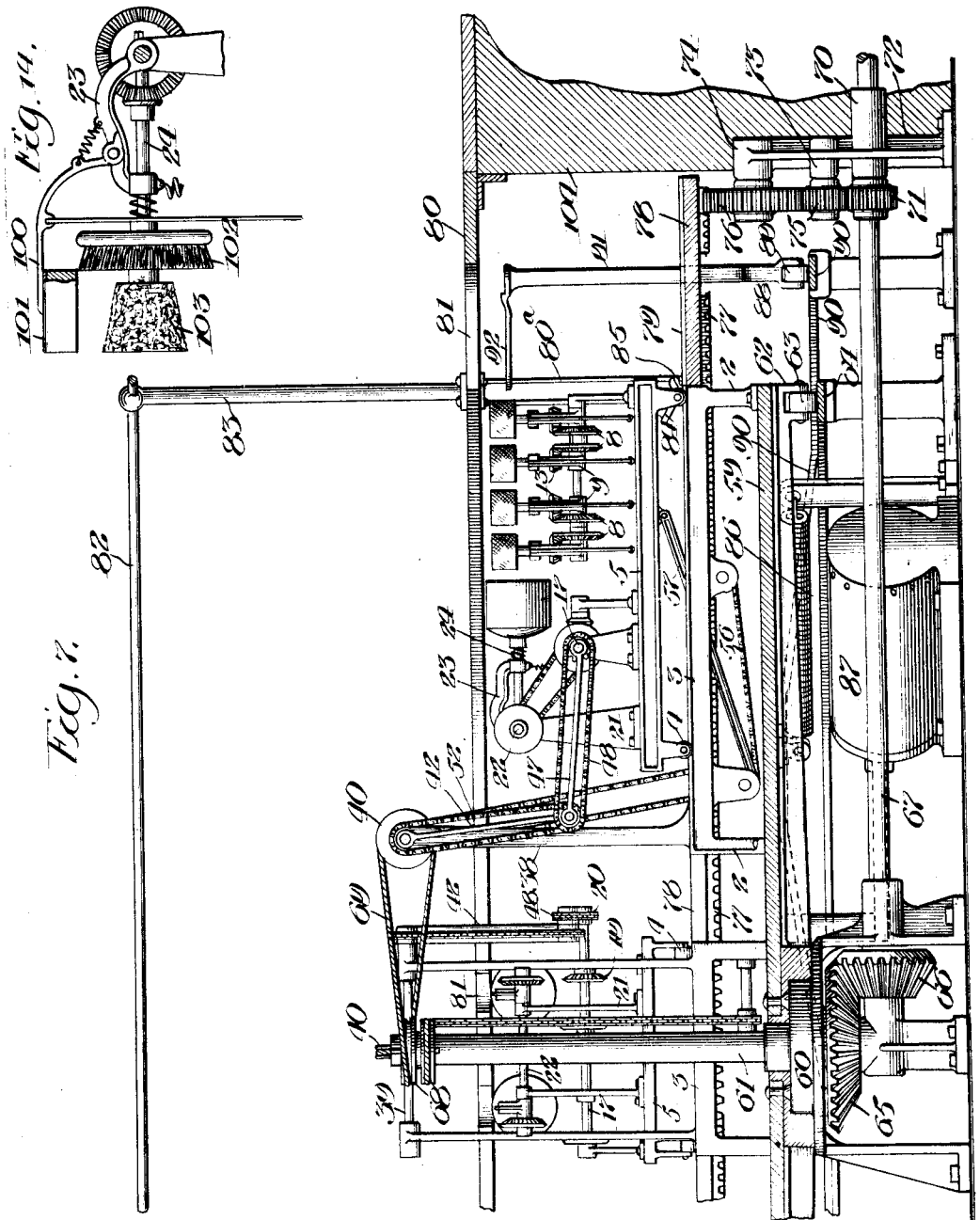

W. R. PIERCE.
SHOE SHINING MACHINE.
APPLICATION FILED JUNE 22, 1910. RENEWED OCT. 18, 1912.

1,049,393.

Patented Jan. 7, 1913.
6 SHEETS—SHEET 6.

Witnesses

Inventor
William Richard Pierce
by Benjamin + Roodhouse
Atty

UNITED STATES PATENT OFFICE.

WILLIAM RICHARD PIERCE, OF CHICAGO, ILLINOIS.

SHOE-SHINING MACHINE.

1,049,393. Specification of Letters Patent. Patented Jan. 7, 1913.

Application filed June 22, 1910, Serial No. 568,265. Renewed October 18, 1912. Serial No. 726,569.

*To all whom it may concern:*

Be it known that I, WILLIAM RICHARD PIERCE, a citizen of the United States, residing at Chicago, in the county of Cook and State of Illinois, have invented a new and useful Shoe-Shining Machine, of which the following is a specification.

Figure 2:
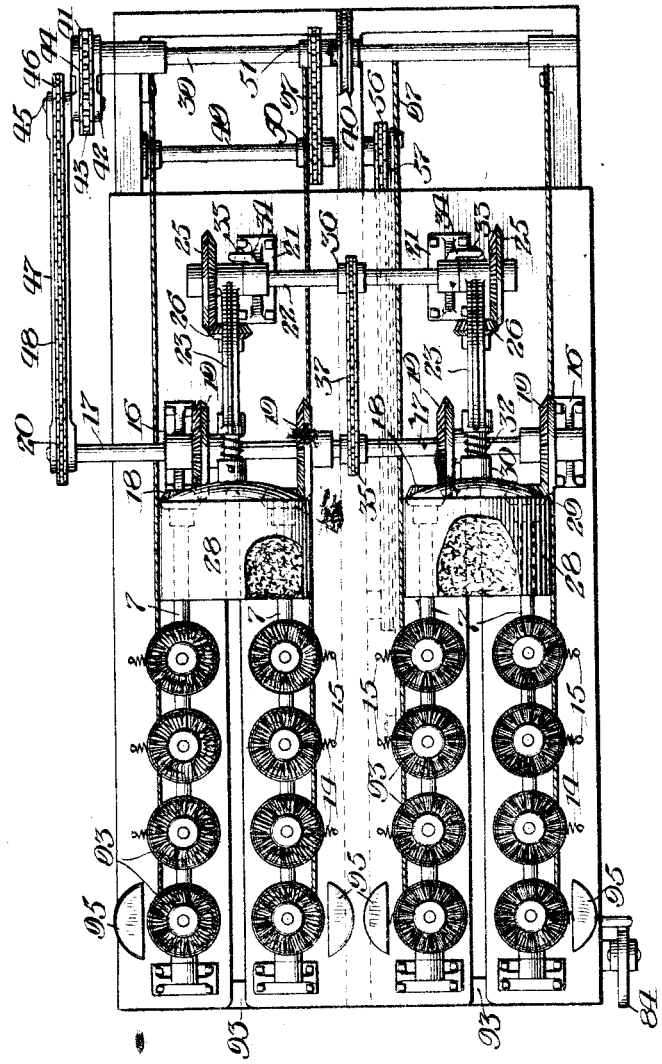
Figure 13:
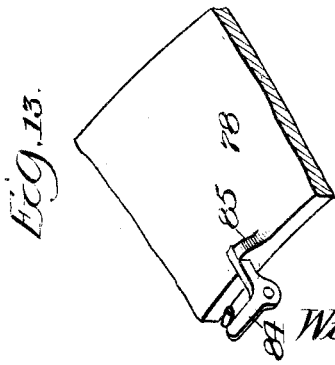
Figure 3:
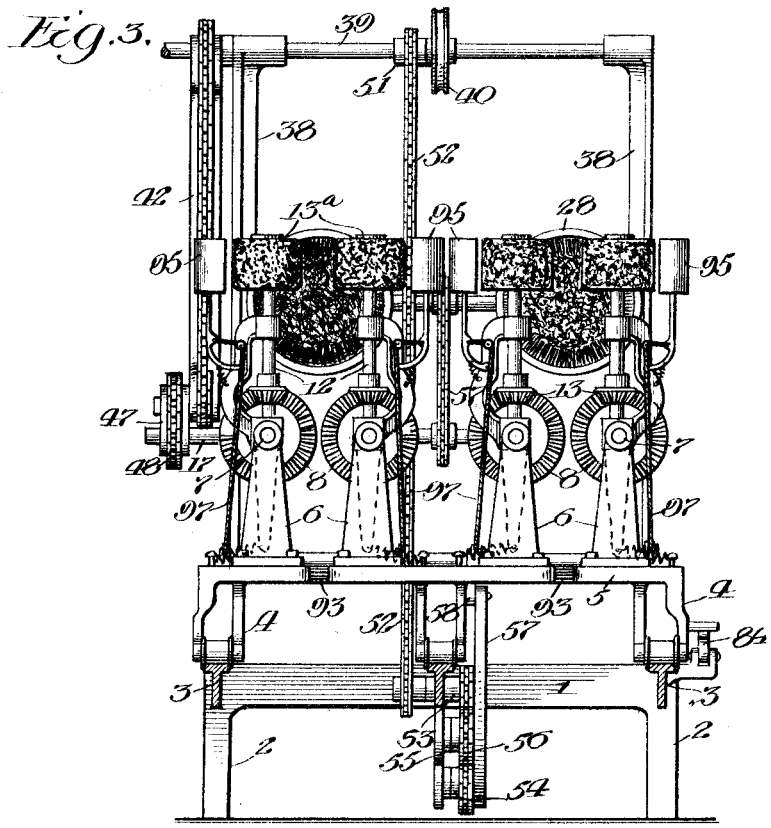
Figure 4:
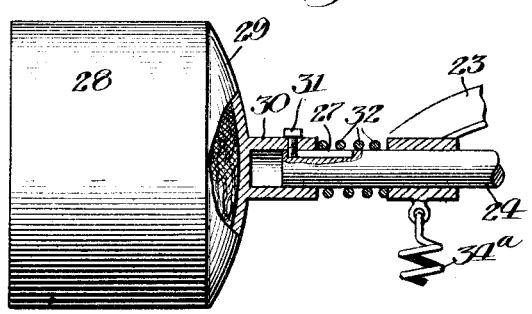
Figure 8:
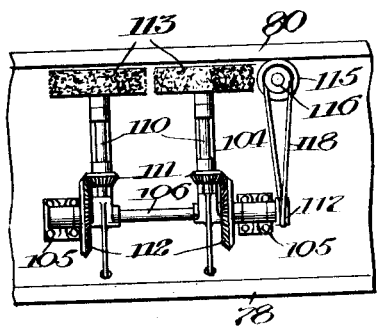
Figure 9:
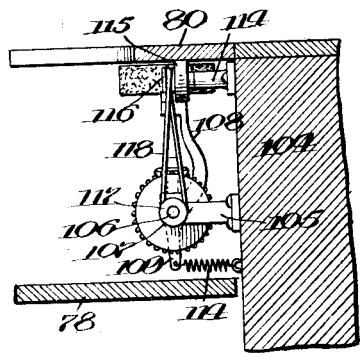
Figure 10:
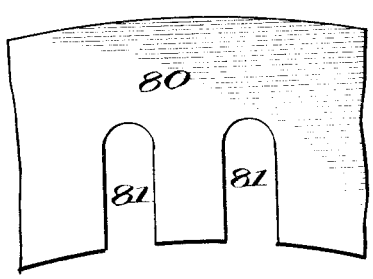
Figure 11:
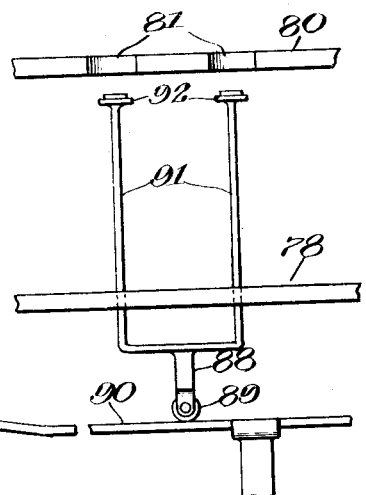
Figure 12:
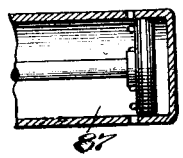

My invention relates to the provision of facilities for mechanically cleaning, blacking and polishing, or cleaning, dressing and polishing shoes; and the objects of my invention are, first, the provision of means for cleaning the shoes; second, the provision of means for applying the blacking or dressing to the shoes; third, the provision of means for polishing the shoes; fourth, the arrangement of various sets of cleaning and polishing mechanisms upon movable tables or platforms whereby there will be facilities for the customer to place his feet at proper places in the machine and while so placed the customer's shoes will be subjected to the successive action of the various sets of mechanisms. I attain these objects by the mechanism illustrated in the accompanying drawings, in which, Figure 1 is a side elevation of that portion of my invention which polishes the shoes. Fig. 2 is a plan of the mechanism shown in Fig. 1. Fig. 3 is an end elevation of the mechanism shown in Figs. 1 and 2. Fig. 4 is a detail of a toe cleaning and polishing member. Fig. 5 is a detail of one of the yielding arms which carry the polishing drums and brushes and the mechanism which supplies the blacking or dressing to the brushes. Fig. 6 is a top plan of the platforms in combination with which the cleaning and polishing mechanism is installed. Fig. 7 is a vertical section on line 7—7 of Fig. 6. Fig. 8 is a front elevation of the heel cleaning and polishing mechanism. Fig. 9 is a side elevation of the mechanism shown in Fig. 8. Fig. 10 is a detail of the portion of the platform in which the customer's shoes are received. Fig. 11 is a detail of the shoe supporting brackets and means of operation. Fig. 12 is a sectional detail of the end of the check cylinder. Fig. 13 is a perspective of the notch upon the inner oscillating platform for engaging the rotating platform; and Fig. 14 is a dauber for the toe brushes.

Similar reference numerals refer to similar parts throughout the several views.

Referring now more particularly to Figs. 1, 2, 3, 4 and 5, the reference numeral 1 refers to a suitable base, which is secured to an oscillating platform or table, to be hereafter described, by means of the legs, 2. Upon the top at each side of base, 1, are disposed tracks, 3. Upon the tracks, 3, rests wheels, 4, of a truck, 5. Rising from the top of truck, 5, are standards, 6, in which are journaled shafts, 7. The shafts, 7, have keyed or otherwise securely fastened thereto at suitable intervals the beveled gears, 8. Rotatably mounted upon the shaft, 7, close to the beveled gears, 8, are collars, 9, which have extending therefrom arms 10, and downwardly therefrom lever arms, 11. In the arm, 10, is rotatably mounted a shaft, 12, upon the lower end of which is a beveled gear, 13, which meshes with the beveled gear, 8, and upon the top of vertical shaft, 12, is mounted either a polishing or buffing or brushing wheel, 13ª. A spring, 14, is connected to the lower end of the arm, 11, and also to a pin, 15, fixed in a suitable portion of the top of the truck, 5.

It will now be seen that the rotation of the shaft, 7, will drive through the beveled gear, 8, and beveled gear, 13, the vertical shaft, 12, and the brushing or polishing wheel, 13ª, and that the polishing wheel will be yieldingly maintained in position by means of the spring, 14. As will be seen in Figs. 1, 2, and 3, the shafts 7 are arranged close together in pairs parallel to each other and several brush or polishing wheels, 13ª, are arranged on each shaft 7, so that the wheels extend in lines closely parallel to each other and so that when a shoe is held in position to enter between two sets of wheels, 13ª, the wheels will be separated and at the same time will be held yieldingly against the shoe.

To the rear of the standards, 6, upon the truck, 5 are standards, 16, and in the standards, 16, is journaled a shaft, 17, which extends transversely to shafts, 7. The inner ends of the shafts, 7, are provided with beveled gears, 18, and there are provided upon the shafts, 17, bevel gears, 19, to mesh with the bevel gears, 18. Upon one end of the shaft, 17, which extends through and beyond one of the standards, 16, is provided a sprocket wheel, 20, through which power is communicated to the shaft, 17, by means to be hereafter described. To the rear of the standard, 16, upon the truck, 5, are located other standards, 21, in which is journaled a shaft, 22, which extends parallel with the shaft, 17. Revolubly mounted upon the shaft, 22, are the brackets, 23, in which are rotatably mounted shafts, 24. Bevel gears, 25, are keyed to the shaft, 22, and bevel gears, 26, are mounted upon the shafts, 24, to mesh with the bevel gears, 25. In the outer end of the shaft, 24, as clearly shown in Fig. 4, there is a slot, 27. A cylinder 28, having a rear wall 29, in which there is a socket, 30, adapted to slip over the outer end of the shaft, 24, is provided with interiorly mounted brushes or polishing material, and a set screw, 31, screws through the wall of the shank, 30, into the slot, 27, upon the end of the shaft, 24. A coil spring, 32, is inserted between the end of the bracket, 23, and the rear face of the socket, 30, to keep the cylinder, 28, yieldingly in its most forward position. Upon the rear end of the bracket, 23, is a projection or lug, 33, which extends under a projection or lug, 34, upon the top of the standards, 21. This construction is to prevent the bracket, 23, from swinging too far toward the ground, and a spring, 34ª, is secured to the forward end of the bracket, 23, to yieldingly maintain it in the position secured by the engagement of the lugs, 33 and 34. A sprocket wheel, 35, is mounted upon the shaft, 17, and alining with the sprocket wheel, 35, upon the shaft, 22, is mounted another sprocket wheel, 26, which sprocket wheels are connected by the sprocket chain, 37.

As will be seen hereafter, it is my purpose to have suitable foot rests for the shoes and to move the polishing mechanism just described so that it will act upon the shoes while they are upon the rests and will then be withdrawn out of communication therewith.

In order to drive the mechanism just described and at the same time move the truck, 5, forwardly and backwardly to act upon the shoes, I have provided the following mechanism: Upon the rear of the base, 1, are provided the vertical standards, 38, in the top of which is mounted the shaft, 39. In the center of the shaft, 39, is a pulley, 40, which is connected with a suitable source of power. Upon one end of the shaft, 39, is a sprocket wheel, 41, and about the sprocket wheel, 41, is rotatably mounted upon the shaft, 39, the bifurcated ends of an arm or link, 42. The other end of the link, 42, is also bifurcated and in the bifurcation is mounted, so as to aline with the sprocket wheel, 41, the sprocket wheel, 43, the sprocket wheels, 41 and 43, being connected by a sprocket chain, 44. The sprocket wheel, 43, is keyed to a short shaft, 45, upon which is mounted another sprocket wheel, 46. Another bifurcated link, 47, is mounted about the sprocket wheel, 46, and extends into connection with the outer end of the shaft, 17, and about the sprocket, 20, mounted thereon. A sprocket chain, 48, connects the sprocket wheels, 46 and 20, to drive the shaft, 17. It will now be seen that the shaft, 17, upon the movable truck, 5, will be rotated and will at the same time permit of the movement of the truck, 5. In order to move the truck, 5, I have mounted within the base, 1, a shaft, 49, upon which is a sprocket wheel, 50. A sprocket wheel, 51, is mounted upon the shaft, 39, to aline with the sprocket wheel, 50, and a sprocket chain, 52, connects them. Another sprocket wheel, 53, is mounted upon the shaft, 49, and alining with said last mentioned sprocket wheel is a sprocket wheel, 54, located below the sprocket wheel, 53, and a sprocket wheel, 55, located forwardly of the sprocket wheels, 53 and 54, in about the central portion of the base, 1. A sprocket chain, 56, connects and runs over the sprocket wheels, 53, 54 and 55. An arm, 57, is secured to the sprocket chain, 56, and also to a bracket, 58, upon the bottom of the truck, 5. It will now be seen that when the shaft, 49, is rotated it will cause the movement of the sprocket chain, 56, and through it the arm, 57, which will move the truck, 5, forwardly and backwardly. When the arm, 57, is passing between the sprocket wheels, 53 and 54, the truck 5 is at rest. This is to permit of the oscillation of the platform to be hereafter described.

It is my object to install a number of these machines upon a relatively stationary platform, which shall be located with reference to a relatively movable platform and rests for the shoes that the shoes will be successively subjected to the action of the different mechanisms. The movable platform and their arrangement are clearly shown in Figs. 6 and 7.

Referring now more particularly to Fig. 7, it will be seen that the base, 1, is secured to a rotatable platform or turntable, 59, which is secured to a collar, 60, surrounding the central power shaft, 61. Depending from the outer edges of the turntable, 59, are brackets, 62, having wheels or rollers, 63, mounted therein, which rest upon a circular rail, 64, provided for their travel. The central power shaft, 61, has secured thereto under the collar, 60, a bevel gear 65, and meshing therewith is a bevel gear, 66, which is mounted upon the end of a horizontal shaft, 67, which extends beyond the platforms to be described and through which power is applied to drive the machine. Upon the top of the power shaft, 61, are provided the pulleys, 68, which by means of the belts, 69, connect with the respective pulleys 40, of the different groups of shoe-shining mechanisms mounted upon the rotatable turntable or platform, 59. The outer end of the shaft, 67, extends through a bearing, 70, and just inside of this bearing upon the shaft is mounted a gear, 71. The bearing, 70, is provided in a casting, 72, which has extended from it, directly above the bearing, 70, the short shafts, 73 and 74, upon which are mounted the gears 75 and 76, which train with the gear, 71. The gear, 76, meshes with a circular rack, 77, upon the under side of a circular platform, 78, which is concentric with the rotatable platform, 59, and the top of which is flush with the top of the base 1, of the shoe shining mechanism. Tracks, 79, are laid at proper intervals upon the platform, 78, which will coincide with and form extensions to the tracks, 3, upon the base, 1, when they come opposite thereto.

Supported above the platform, 78, by the standards, 80ª, arising therefrom, is a platform, 80, in which there are apertures, 81, as clearly shown in Figs. 6, 7, 10, and 11, in which the shoe rests operate. A rail, 82, upon suitable standards, 83, is mounted upon the inner edge of the platform, 80, so that the patrons may steady themselves while their shoes are being operated upon. It will now be seen that the circular platforms, 78 and 80, will be continuously rotated by the shaft, 67, through the gears, 71, 75, and 76. A right angle dog, 84, pivoted upon the outer end of the base, 1, engages with suitable detents, 85, upon the circular platform, 78. The detents are so spaced that when the dog and detents are in engagement, the tracks, 79, upon the circular platform forms an extension of the tracks, 3, upon the base, 1. While the dog and detents are in engagement, the oscillating table, 59, will be carried around by the movement of the circular platform, 78, and while these parts are traveling together the speed of the chain, 56, is so timed as to cause the truck, 5, to be carried outwardly upon the rails, 79, and the cleaning and polishing brushes, 13ª, are carried past the shoes which have been introduced into their path through the apertures, 81. When the truck, 5, has been withdrawn from over the platform, 78, its outer end engages the right angle dog, 84, and disengages it from the detent, 85. I have provided a spring, 86, clearly shown in Figs. 6 and 7, which will return the platform, 59, when the dog has been disengaged from one detent to the position it had when first engaged by the preceding detent to a position where the dog will be engaged by another detent, at which position another set of brushes will be in position to operate upon the shoes. A recoil drum, 87, has been provided to prevent the spring, 86, from returning the oscillating table, 59, too quickly. In order to support the shoes, and secure their introduction into the apertures, 81, in a suitable manner so that they can be operated upon by the brushes, and polishers, I have provided the stand 92 clearly shown in Figs. 7 and 11. This stand comprises a base column, 88, the lower end of which is provided with a wheel, 89, which travels upon a track, 90, which is raised in a portion of its course so that the shoes of the patron after having been placed thereon will be lowered to a proper distance below the platform 80, and in proper relation to the brushes 13ª, upon the moving truck, 5, and will then be elevated to a position substantially flush with the platform, 80, so that they can be readily removed when the shining has been completed. Just below the platform, 78, the base column, 88, branches into the arms, 91, and these arms turn upwardly and extend through the platform, 78, and upon their upper ends, which extend into proper relation with the apertures, 81, are carried shoe rests, 92. As clearly shown in Figs. 2 and 6, there is provided in the trucks, 5, slots, 93, which extend between each two rows of coöperating polishing brushes, 13ª. The arms, 91, extend through the slots, 93, as the truck moves outwardly to polish the shoes.

In Figs. 5 and 14, I have shown two similar sets of mechanism for automatically applying blacking or dressing to the brushes. In Fig. 5, is illustrated a form of daubing mechanism used with a brush for the sides of the shoe. In this form a curved arm, 94, is pivoted to the arm 10, which carries the brush spindle, 12. This arm extends upwardly into proximity with the brush, 13ª, and carries a semi-cylindrical blacking or dressing containing box, 95, on the upper end thereof. A spring, 96, extending between the arms, 10 and 94, serves to keep the dressing container box, 95, away from the brush. A cord, 97, is secured to the arm, 94, and from thence extends over a pulley or shield 98, upon the arm, 10, through another pulley, 99, upon the truck, 5, to a point upon one of the standards, 38, upon the rear of the base, 1. This cord is of such a length that it does not become taut and draw the dressing container box into contact with the brush until the truck, 2, reaches the end of its outward movement.

The mechanism illustrated in Fig. 14, is for the purpose of supplying blacking or dressing to a horizontally disposed toe shining brush, and is similar in operation to the mechanism shown in Fig. 5. In this case the bracket, 23, has pivoted thereto a curved arm, 100, on the end of which is a blacking or dressing container box 101. In this case spindle, 24, carries on the end thereof, instead of the hollow cylinder, 38, a brush, the rear portion of which has horizontally disposed bristles 102, for acting upon the front edge of the toe and the front portion of which has bristles 103, extending radially from the center of revolution for action upon the top of the toe.

In Figs. 8 and 9, are shown a mechanism for polishing the heels of the shoe, and this mechanism is also shown in Fig. 6. As will be seen from Fig. 7 a wall, 104, extends vertically close to the outer edges of the platforms, 78 and 80. Extending outwardly from this wall, 104, extends brackets, 105, in which are journaled a shaft, 106. Upon this shaft are rotatably mounted brackets, 107, which have arms 108 and 109, similar in all respects to the brackets 9 and arms 10 and 11. A spindle 110 is mounted in the arm, 108, which has a beveled gear, 111, thereon, which is driven by a bevel gear, 112, upon the shaft, 106. Polishing brushes, 113, are carried upon the upper ends of the spindles, 110. A spring, 114, secured to the arm 109, and the wall, 104 serves to hold the brushes 113, yieldingly against the heels of the shoes. The brushes 113, are driven in the following manner: A bracket, 114, extends from the wall, 104, at a point just below the platform, 80. This bracket carries a friction wheel, 115, which contacts the movable platform, 80, and is driven by it, and which carries a pulley, 116. The shaft, 106, extends outside of one of the brackets, 105, and upon its end is secured a pulley, 117. A belt 118, passes over the pulleys 116 and 117, thereby carrying power from the friction wheel, 115, through the gears to the spindles, 110, and bristles, 113.

Having thus described my invention, what I claim as new and desire to secure by Letters Patent, is:—

1. A shoe shining machine comprising a shoe support, a truck, a pair of parallel shafts mounted upon said truck, a plurality of brushes pivotally mounted upon and geared to each of said shafts, means for rotating said shafts and the brushes carried thereby, and means for moving said truck to bring said shafts and the brushes carried thereby upon opposite sides of said support.

2. A shoe shining machine comprising a shoe support, a truck, parallel shafts mounted upon said truck, yieldingly mounted brushes upon each shaft, means for rotating adjacent brushes upon the same shaft in opposite directions, and means for moving said truck to bring said brushes closely adjacent to said support.

3. A shoe shining machine comprising a truck, parallelly disposed shafts mounted thereon, brackets pivoted upon said shafts, spindles carried by said brackets and driven by said shafts, shoe shining devices carried by said spindles, means for driving said shafts, a shoe support, and means for moving said truck to bring said devices into contact with shoes upon said supports.

4. A shoe shining machine comprising a rotatable platform, shoe supports carried thereby, another independently rotatable platform, trucks mounted thereon, brushes mounted upon said trucks, means for driving said brushes, means tending to maintain said last mentioned platform in a fixed position, means for locking said platforms together, means for moving said trucks to bring said brushes into and out of proximity with said shoe supports, and means controlled by the movement of said trucks for disengaging said platforms.

5. A shoe shining machine comprising a rotatable platform, shoe supports carried thereby, another independently rotatable platform, trucks mounted thereon, brushes mounted on said trucks, means for driving said brushes, means for moving said trucks to bring said brushes into operative proximity with said supports, means tending to maintain said last mentioned platform in a fixed position, and brushes actuated by the movement of said rotating platform for contacting the heels of shoes upon said supports.

6. A shoe shining machine comprising a rotatable platform, shoe supports secured thereto, means actuated by the movement of said platform for moving said supports into different vertical positions, another platform, means for locking said platforms together, means tending to maintain said last mentioned platform in a fixed position, means controlled by the movement of said platforms for releasing them from engagement, means for engaging and disengaging said platforms, trucks upon said last mentioned platform, shoe shining mechanism thereon, and means for moving said trucks to bring said mechanism into and out of operative proximity with said supports.

In testimony whereof I affix my signature in the presence of two witnesses.

WILLIAM RICHARD PIERCE.

Witnesses:
O. M. WERMICH,
BENJ. T. ROODHOUSE.